United States Patent
Schwulst (10) Patent No.: US 9,233,493 B2
(45) Date of Patent: Jan. 12, 2016

(54) THROTTLE BODY WITH BLADE AND SHAFT INJECTION MOLDED WITHIN THE BODY

(75) Inventor: Kyle E. E. Schwulst, Whitmore Lake, MI (US)

(73) Assignee: ELECTROJET, INC., Brighton, MI (US)

( * ) Notice: Subject to any disclaimer, the term of this patent is extended or adjusted under 35 U.S.C. 154(b) by 824 days.

(21) Appl. No.: 13/248,559

(22) Filed: Sep. 29, 2011

(65) Prior Publication Data

US 2013/0081594 A1     Apr. 4, 2013

(51) Int. Cl.
    B29C 45/00     (2006.01)
    B29L 31/00     (2006.01)
    F02D 9/10      (2006.01)

(52) U.S. Cl.
    CPC ..... B29C 45/0017 (2013.01); *B29L 2031/7506* (2013.01); *F02D 9/107* (2013.01); *F02D 9/108* (2013.01)

(58) Field of Classification Search
    CPC .......... F02D 9/10; F02D 9/107; F02D 9/108; F02D 9/1075; B29C 45/0017; B29L 2031/7506
    USPC ........................................................ 123/337
    See application file for complete search history.

(56) References Cited

U.S. PATENT DOCUMENTS

| | | | | |
|---|---|---|---|---|
| 3,675,888 A | * | 7/1972 | Scaramucci | 249/57 |
| 3,750,698 A | * | 8/1973 | Walchle et al. | 137/375 |
| 3,771,764 A | * | 11/1973 | Miyauchi | 251/306 |
| 3,862,740 A | * | 1/1975 | Gallagher et al. | 251/305 |
| 4,333,429 A | * | 6/1982 | Iiyama et al. | 123/274 |
| 4,621,790 A | * | 11/1986 | Balter | 251/305 |
| 5,304,336 A | * | 4/1994 | Karlsson et al. | 264/242 |
| 5,421,718 A | | 6/1995 | Karlsson et al. | |
| 5,503,544 A | * | 4/1996 | Platusich | 425/116 |
| 5,509,441 A | * | 4/1996 | Platusich | 137/375 |
| 5,704,335 A | * | 1/1998 | Akutagawa et al. | 123/337 |
| 5,878,715 A | * | 3/1999 | Hernandez et al. | 123/337 |
| 5,988,119 A | * | 11/1999 | Trublowski et al. | 123/41.31 |
| 6,067,958 A | * | 5/2000 | Kamimura et al. | 123/337 |
| 6,273,119 B1 | * | 8/2001 | Foster et al. | 137/15.25 |
| 6,725,833 B1 | * | 4/2004 | Irihune et al. | 123/399 |
| 6,804,997 B1 | | 10/2004 | Schwulst | |
| 6,840,260 B2 | * | 1/2005 | von Willich | 137/15.25 |
| 6,901,942 B2 | * | 6/2005 | Krimmer et al. | 137/15.25 |
| 6,955,081 B2 | | 10/2005 | Schwulst | |
| 7,069,902 B2 | | 7/2006 | Arai et al. | |
| 7,089,663 B2 | * | 8/2006 | Arai et al. | 29/888.4 |

(Continued)

*Primary Examiner* — Hieu T Vo
*Assistant Examiner* — Sherman Manley
(74) *Attorney, Agent, or Firm* — Brooks Kushman P.C.

(57) ABSTRACT

A throttle body assembly, and method of manufacturing such, is disclosed having a unitary shaft and blade component injection molded in situ within a throttle body housing to mechanically entrap the shaft and blade component, yet still allowing for it to partially rotate, within the throttle body housing. The throttle body housing defines an interior passage, a shaft through-hole, and a shaft socket opposite the shaft through-hole, both aligned along a transverse axis to the interior passage. The shaft and blade component is a single unitary piece injection molded in situ within the throttle body housing, such that it has a blade section disposed within the interior passage, first and second shaft sections extending from the blade section opposite each other partially disposed within the shaft socket and shaft through-hole, respectively, and a pivotable axis generally coaxial with the transverse axis.

14 Claims, 5 Drawing Sheets

(56) References Cited

U.S. PATENT DOCUMENTS

| | | |
|---|---|---|
| 7,107,678 B2 * | 9/2006 | Arai et al. .................... 29/888.4 |
| 7,107,679 B2 * | 9/2006 | Arai et al. .................... 29/888.4 |
| 7,107,683 B2 * | 9/2006 | Arai et al. .................... 29/888.4 |
| 7,225,793 B2 | 6/2007 | Schwulst et al. |
| 7,328,507 B2 | 2/2008 | Arai et al. |
| 7,790,083 B2 * | 9/2010 | Lorenz et al. ................. 264/264 |
| 7,846,364 B2 | 12/2010 | Arai et al. |
| 2005/0198823 A1 * | 9/2005 | Voiz .......................... 29/890.12 |
| 2008/0072873 A1 * | 3/2008 | Kuhnel et al. ................. 123/319 |
| 2010/0090148 A1 | 4/2010 | Deiss et al. |

* cited by examiner

THROTTLE BODY WITH BLADE AND SHAFT INJECTION MOLDED WITHIN THE BODY

BACKGROUND

1. Field

The invention relates to throttle body assemblies for internal combustion engines, and in particular, the injection molding of a shaft and blade component in situ within the throttle body housing.

2. Background Art

A throttle is the mechanism that constricts or obstructs the flow of a fluid. An engine's power may be increased or decreased by the restriction of inlet gases by the use of a throttle. In a fuel-injected engine, the throttle is typically placed on the entrance of the intake manifold, or housed in a throttle body. In a carbureted engine, it is found in the carburetor.

A fuel-injected engine's throttle is typically a butterfly valve located within the interior passage of a throttle body assembly. When the blade of the butterfly valve is wide open (in-line with fluid flow), the engine may run at full power. When the blade of the butterfly valve is partially closed (at an angle to the fluid flow), the engine's power is decreased.

Butterfly valves within throttle body assemblies may be controlled by an operator using a pedal or lever with a direct mechanical linkage, or with an Engine Control Unit (ECU). ECUs receive information from sensors (or the operator), process the information, and in turn control the position of the butterfly valve. Often the position of the butterfly valve, as controlled by an ECU, is based on the desired engine outputs as programmed into the ECU. The ECU sends a signal to rotate the blade of the butterfly valve inside the throttle body, opening the throttle passage to allow more air into the intake manifold increasing the engine's power.

Examples of throttle body assemblies and ECUs used with internal combustion engines may be found in U.S. Pat. Nos. 6,804,997 and 6,955,081 to Schwulst, and U.S. Pat. No. 7,225,793 to Schwulst et al., all of which are hereby incorporated by reference in their entirety.

Traditionally throttle body assemblies have been made of metal with a multi-component pin and blade sub-assembly assembled into the interior passage of the throttle body housing. Some improvements to this traditional design have included injection molded throttle body housings with blades injection molded in the throttle body housing around, or connected to, an inserted pin (or pins) to support and rotate the blade. These throttle body assemblies require additional complexity of bushings and seals to manage the support of the pin(s) and allow rotation of the blade.

The following references were considered in conjunction with preparing this application: U.S. Pat. No. 7,846,364 to Arai et al., U.S. Pat. No. 7,790,083 to Lorenz et al., U.S. Pat. No. 7,328,507 to Arai et al., U.S. Pat. No. 7,107,679 to Arai et al., U.S. Pat. No. 7,107,678 to Arai et al., U.S. Pat. No. 7,089,663 to Arai et al., U.S. Pat. No. 7,069,902 to Arai et al., U.S. Pat. No. 5,421,718 to Karlsson et al., U.S. Pat. No. 5,304,336 to Karlsson et al., and U.S. P.G. Pub. No. 2010/0090148 to Deiss et al.

SUMMARY

A throttle body assembly, and respective method of manufacturing such, is disclosed having a shaft and blade component that is injection molded in situ within a throttle body housing to mechanically entrap the shaft and blade component within the throttle body housing yet still allowing for the shaft and blade component to at least partially rotate within the throttle body housing.

In the main embodiment, the throttle body housing defines an interior passage with a longitudinal axis, a shaft through-hole passing through the throttle body housing on a transverse axis generally perpendicular to the longitudinal axis, and a shaft socket opposite the shaft through-hole aligned along the transverse axis. The shaft and blade component is a single unitary piece injection molded in situ within the throttle body housing, such that the shaft and blade component has a pivotable axis generally coaxial with the transverse axis.

The shaft and blade component has a blade section disposed within the interior passage, a first shaft section extending from the blade section along the pivotable axis at least partially disposed within the shaft socket, and a second shaft section extending from the blade section along the pivotable axis opposite the first shaft section at least partially disposed within the shaft through-hole. The shaft and blade component is injection molded in situ within the throttle body housing to mechanically entrap the shaft and blade component within the throttle body housing, while still allowing the shaft and blade component to rotate.

In some embodiments, the shaft socket may be a blind hole extending from the interior surface into the throttle body housing without breaking through to the outer surface. In other embodiments, the shaft socket may be a hole extending from the interior surface through to the exterior surface. In the case of the shaft socket extending through to the outer surface, the throttle body assembly may further comprise a socket plug inserted into the shaft socket to provide the bottom of a blind hole, or the first shaft may just extend past the outer surface of the throttle body housing.

In some embodiments, the first shaft section has an outer surface profile, the shaft socket has an inner surface profile, and the inner surface profile of the shaft socket is larger than the outer surface profile of the first shaft section providing for a clearance. As well, the second shaft section has a substantially constant outer diameter extending along the length of the second shaft section, the shaft through-hole has a substantially constant inner diameter extending along the length of the shaft through-hole, and the shaft through-hole inner diameter is larger than the second shaft outer diameter providing for a similar clearance. These clearances allow for the integrated shaft and blade component to at least partially rotate about the pivotable axis.

The interior surface has generally circular cross-section along the transverse axis between the shaft socket and the shaft through-hole with an interior diameter. The blade section is generally ovate shaped with a small diameter along the pivotable axis, and a large diameter perpendicular to the small diameter. The small diameter of the blade section is substantially equal to or smaller than the interior diameter of the circular cross-section, allowing the blade section to rotate within the interior passage. The large diameter of the blade section is substantially equal to or larger than the interior diameter of the circular cross-section, allowing for a line-to-line match or contact with the interior surface. In the preferred embodiment, the large diameter is such that when the blade section is rotated to contact the interior surface, the blade section is offset 5°-10° from the plane defined through the circular cross-section.

The integrated shaft and blade component further comprise an actuation tab connected to the second shaft section opposite of the blade section and extending way from the second shaft section in a generally perpendicular direction to the pivotable axis.

In yet another embodiment, an electronic actuator may be connected to the actuation tab. The electronic actuator is capable of moving the actuation tab and rotating the integrated shaft and blade component along the pivotable axis.

In some embodiments, the throttle body housing defines a pressure passage passing through the throttle body housing from the interior surface to the exterior surface, and the throttle body assembly further comprises an electronic throttle controller (ETC) attached to the throttle body housing having a pressure sensor in fluid communication with the interior passage through the pressure passage. In the preferred embodiment, the ETC reads the pressure in the interior passage with the pressure sensor, processes the readings, and sends a signal to the electronic actuator to rotate the shaft and blade component to open or close the interior passage accordingly.

In yet other embodiments, the throttle body housing is made from a first polymer, the integrated shaft and pin component is made from a second polymer, and the first and second polymers do not readily adhere to one another. It should be noted, however, that some initial sticking of the two polymers may occur, and this initial sticking may be broken when the shaft and blade component is partially rotated the first time.

In still another embodiment, the throttle body housing is made from a first polymer, the integrated shaft and pin component is made from a second polymer, and the second polymer has a lower melting temperature than the first polymer.

And still in yet another embodiment, the throttle body housing is made from a first polymer, the integrated shaft and pin component is made from a second polymer, and the second polymer shrink rate during cooling is substantially equal to or greater than the first polymer. The greater shrinkage rate of the second polymer allows the second polymer to keep up with or pull away from the first polymer when both are cooling.

In another embodiment, a method of manufacturing a throttle body assembly with a unitary shaft and blade component injection molded in situ within a throttle body housing to mechanically entrap the shaft and blade component within the throttle body housing is disclosed.

The first step in the method comprises injection molding the throttle body housing in a first mold, to define the geometry of the throttle body housing of at least one embodiment of the throttle body assembly as described above.

The second step in the method comprises removing at least a portion of the first mold.

The third step in the method comprises injection molding the unitary shaft and blade component in a second mold, wherein a portion of the second mold comprises the interior surface, shaft socket, and shaft through-hole of the throttle body housing. This step produces the unitary shaft and blade component with a geometry consisting of that as described above.

The fourth step in the method comprises cooling the unitary shaft and blade component to cool and shrink away from the throttle body housing to mechanically entrap the shaft and blade component within the throttle body housing while allowing the shaft and blade component to at least partially rotate.

In another embodiment of the method, during the step of injection molding the throttle body housing in the first mold, a first plastic is used, and during the step of injection molding the unitary shaft and blade component in the second mold, a second plastic is used. The two different plastics are such that the second plastic does not readily adhere to the first plastic reducing adhesion of the unitary shaft and blade component to the throttle body housing first plastic by being dissimilar materials.

In yet another embodiment of the method, the step of adding a releasing agent into the second mold before the step of injection molding the unitary shaft and blade component in the second mold is performed. The releasing agent further reduces adhesion of the unitary shaft and blade component to the throttle body housing. The releasing agent may also allow, however, for an initial sticking which may be mechanically cracked during the first rotation of the shaft and blade component.

In still another embodiment of the method, during the step of injection molding the throttle body housing, the first mold defines a geometry of the shaft socket to have a tapered wall that tapers inward as the tapered wall extends away from the interior surface. Then during the step of injection molding the unitary shaft and blade component in the second mold, the tapered wall of the shaft socket will define a tapered end segment of the first shaft section. This tapering is done such that during the step of cooling the unitary shaft and blade component to cool and shrink away from the throttle body housing, the first shaft section shrinks away from the shaft socket in both a longitudinal and transverse direction providing additional clearance to aid in the ability of the unitary shaft and blade component to at least partially rotate within the throttle body.

In still yet another embodiment of the method, during the step of injection molding the unitary shaft and blade component in the second mold, the second mold defines the geometry of the blade section to have an ovate shape with an initial large diameter. This initial large diameter cools and shrinks to a final large diameter during the step of cooling the unitary shaft and blade component to cool and shrink away from the throttle body housing. The final large diameter is still such that when the portion of the blade section on the final large diameter contacts the interior surface, the blade section has a 5° to 10° angle to the substantially circular cross-section transverse to the longitudinal axis.

In a further embodiment of the method, during the step of injection molding the unitary shaft and blade component in the second mold, the second mold defines the geometry of an actuating tab located on the end of the unitary shaft and blade component attached to the second shaft section. The actuating tab is disposed outside of the throttle body housing and is capable of being connected to an electronic actuator to actuate the tab and in turn rotate the unitary shaft and blade component, allowing the blade to be modulated in the interior passage and modulate the flow through the interior passage.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION OF THE EMBODIMENTS

As required, detailed embodiments of the present invention are disclosed herein; however, it is to be understood that the disclosed embodiments are merely examples and that the invention may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
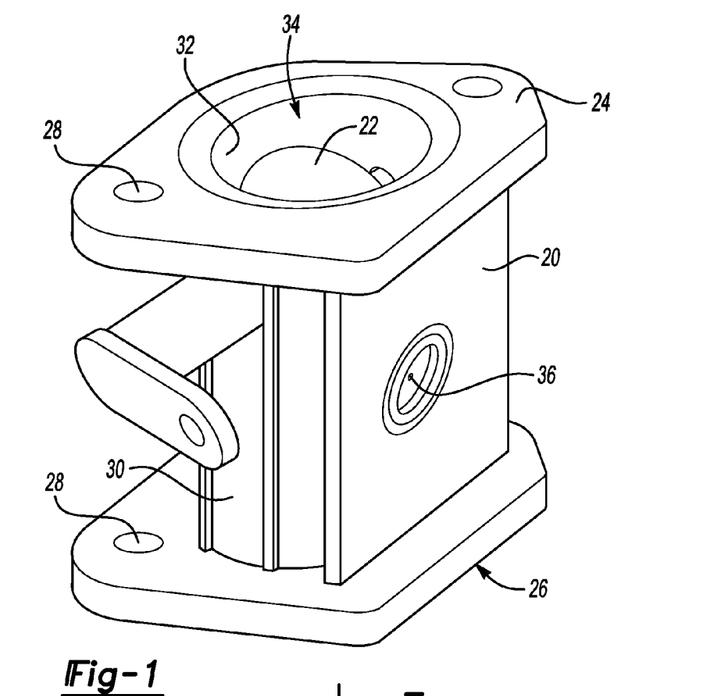
FIG. 1 is a perspective view of a throttle body housing with a unitary shaft and blade component entrapped within.
Figure 2:
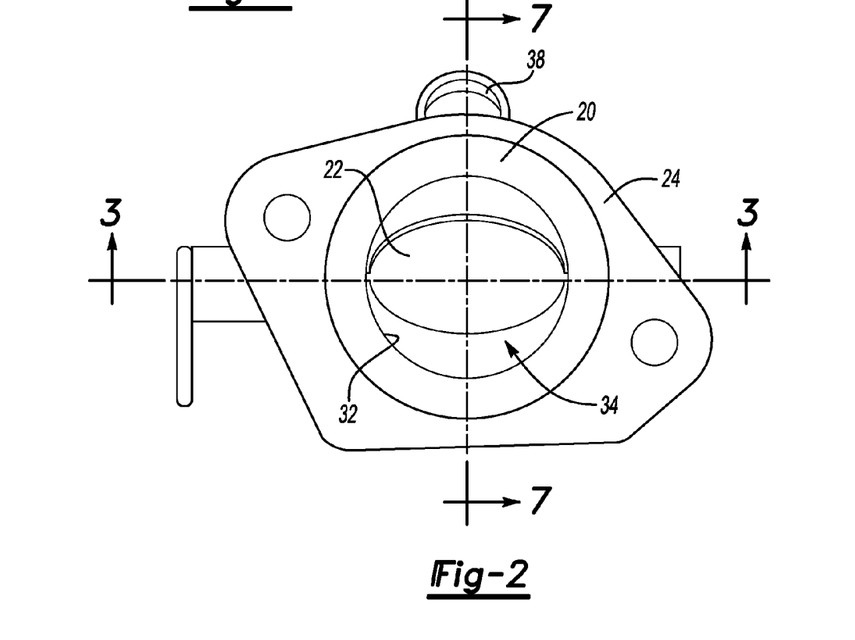
FIG. 2 is an end view of the throttle body housing with the unitary shaft and blade component entrapped within.

Regarding FIGS. 1 and 2, a throttle body housing 20 is shown having a shaft and blade component 22 entrapped within. The throttle body housing 20 may be included as part of an air intake system of an internal combustion engine (not shown). The throttle body housing 20 defines a first attachment region 24, which may be attached to an air filter box (not shown), and a second attachment region 26, which may be attached to the intake manifold (not shown) of the air intake system. Both attachment regions are shown here with attachment holes 28, which allow attachment hardware, such as nuts and bolts (not shown), to pass through the attachment holes 28 and attach the throttle body housing 20 to other components within the air intake system, although any form of attachment known to those of skill in the art could be used.

In the preferred embodiment, the throttle body housing 20 is a single unitary piece that is injection molded having an exterior surface 30 and a generally annular interior surface 32 defining an interior passage 34. The throttle body housing 20 shown here defines a pressure passage 36 passing through the throttle body housing 20 from the exterior surface 30 to the interior surface 32 (see also FIG. 10). As well the throttle body housing 20 as shown here defines an integrally formed injector pocket 38 (see also FIG. 7) capable of receiving a fuel injector (not shown).

Figure 3:
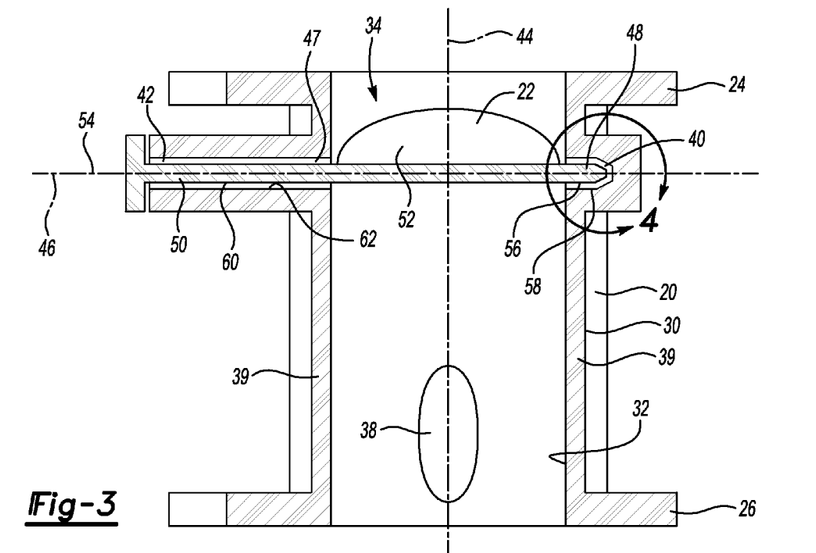
FIG. 3 is a cross-section view taken along line 3-3 in FIG. 2.

Regarding FIG. 3 a cross-section view taken along line 3-3 in FIG. 2 is shown. In this view, the throttle body housing 20 is shown with a generally annular wall 39 disposed between the exterior surface 30 and the interior surface 32. A shaft socket 40 is shown disposed along the interior surface 32, and a shaft through-hole 42 disposed along the interior surface 32 opposite the shaft socket 40. A longitudinal axis 44 is shown running down the center of the generally annular interior surface 32, and the shaft socket 40 and shaft through-hole 42 are aligned on a transverse axis 46 which is generally perpendicular to the longitudinal axis 44. The shaft through-hole 42 is a radial aperture 47 extending through the wall 39.

The shaft and blade component 22 is a single unitary piece injection molded in situ within the throttle body housing 20 to mechanically entrap the shaft and blade component 22 within the throttle body housing 20, yet designed as such that the shaft and blade component 22 is still capable of partial rotation. The shaft and blade component 22 has a first shaft section 48 partially disposed in the shaft socket 40, a second shaft section 50 partially disposed in the shaft through-hole, and a blade section 52 disposed between the first and second shaft sections 48,50 and within the interior passage 34. The shaft and blade component 22 has a pivotable axis 54 generally coaxial, or parallel, with the transverse axis 46. The first and second shaft sections 48,50 extend from the blade section 52 opposite each other generally along the pivotable axis 54.

The first shaft section 48 is designed to have an outer surface profile 56, and the shaft socket 40 is designed to have an inner surface profile 58, such that the inner surface profile 58 of the shaft socket 40 is larger than the outer surface profile 56 of the first shaft section 48 providing a clearance between the two surfaces and allowing for the shaft and blade component 22 to at least partially rotate about the pivotable axis 54. Similarly, the second shaft section 50 is designed to have a substantially constant outer diameter extending along the length of the second shaft section 60, and the shaft through-hole 42 is designed to have a substantially constant inner diameter extending along the length of the shaft through-hole 62, such that the shaft through-hole inner diameter 62 is larger than the second shaft outer diameter 60 providing a clearance between the two surfaces and allowing for the shaft and blade component 22 to at least partially rotate about the pivotable axis 54.

Figures 4, 5:
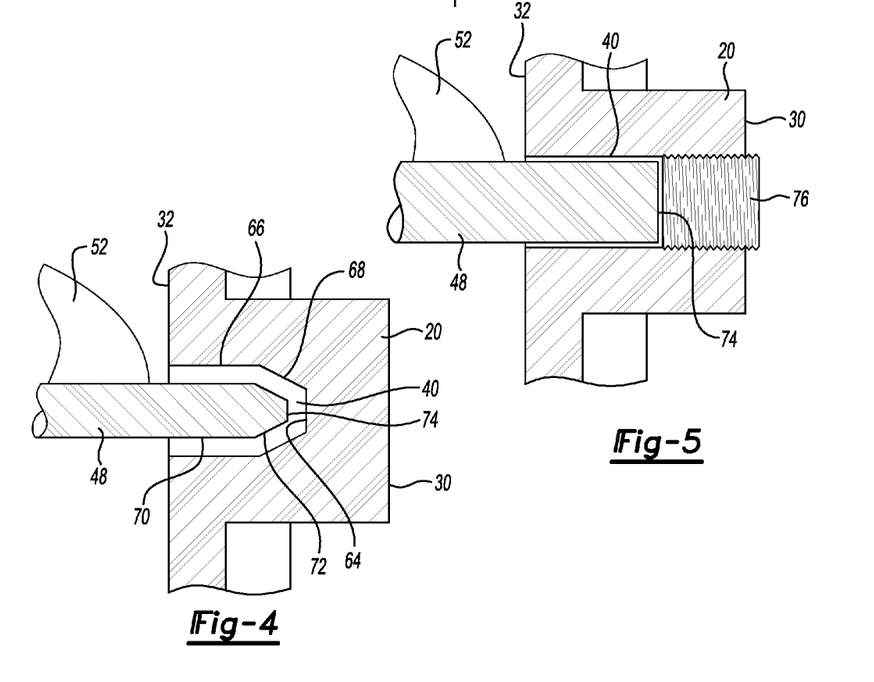
FIG. 4 is a magnified view of a portion of FIG. 3 within circle 4 showing a shaft socket and a portion of the shaft and blade component.
FIG. 5 is an alternate embodiment of FIG. 4 showing a shaft socket extending from the interior surface to the exterior surface of the throttle body housing with a plug partially inserted into the shaft socket.

Regarding FIG. 4 a magnified view of a portion of FIG. 3 within circle 4 is shown such that the shaft socket 40, as defined by the throttle body housing 20, is a blind hole. A blind hole is a hole with a bottom surface 64, meaning that the shaft socket 40 does not extend from the interior surface 32 to the exterior surface 30. In the preferred embodiment, the shaft socket 40 is defined by a side wall 66, a bottom surface 64, and a tapered wall 68 disposed between the side wall 66 and the bottom surface 64, tapering radially inward as the tapered wall 68 extends from the side wall 66 to the bottom surface 64. This tapered configuration acts as some of the boundary conditions for the first shaft section 50 as it is injection molded into the throttle body housing 20.

Due to the boundary conditions of the shaft socket 40 as shown in this figure, the first shaft section has a generally horizontal tubular segment 70 extending from the blade section 52, a tapered segment 72 extending from the generally horizontal tubular segment 70 tapering radially inward as it extends away from the horizontal tubular segment 70, and ends with a generally vertical surface 74. The descriptive terms of horizontal and vertical are from the perspective as shown in the figure and do not represent vehicle location when the throttle body assembly is installed in use. This tapered design of the first shaft section 48 allows for greater control of the pull away of the first shaft section 48 from the shaft socket 40 in both the vertical and horizontal directions as the first shaft section 48 is cooling and shrinking.

FIG. 5 shows an alternate embodiment of FIG. 4 with the shaft socket 40 extending from the interior surface 32 through to the exterior surface 30 of the throttle body housing 20. In this alternate embodiment, a socket plug 76 is partially inserted into the shaft socket 40 providing the vertical surface 74. In this figure, the walls of the shaft socket 40, as made up by the throttle body housing 20 and the socket plug 76, are not tapered. However, the socket plug 76 may be designed with a tapered wall similar to that of the tapered wall 68 in FIG. 4, or the tapered wall 68 may still be defined by the throttle body housing 20 and the socket plug 76 is inserted adjacent to the tapered wall 68 to define the vertical surface 74 extending from the tapered wall 68. Similarly, the throttle body housing 20 may define a blind hole that does not extend past the exterior surface 30 with the non-tapered geometry as shown in FIG. 5.

Figure 6:
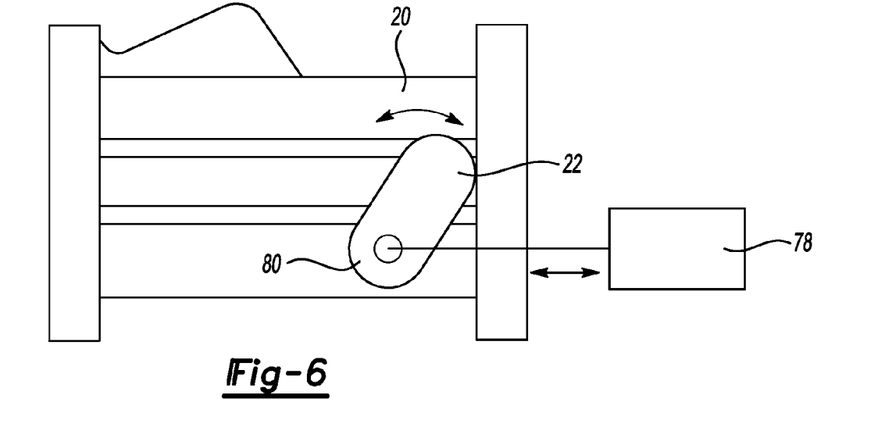
FIG. 6 is a side view of the throttle body housing and an electronic actuator showing rotation of the unitary shaft and blade component.

Regarding FIGS. 6-9, the orientation, design, and actuation of the shaft and blade component 22 are shown. FIG. 6 is a side view of the throttle body housing 20 showing an electronic actuator 78 connected to the shaft and blade component 22. The shaft and blade component 22 has an actuation tab 80 connected to the second shaft section 50 opposite the blade section 52 and generally perpendicular to the second shaft section 50 (seen FIG. 8). In this figure, the electronic actuator 78 is shown as a linear actuator that is capable of moving the actuation tab 80 back and forth to partially rotate the shaft and blade component 22 within the throttle body housing 20 (as shown by the arrows). The electronic actuator 78 is capable of moving the actuation tab 80 and at least partially rotating the shaft and blade component 22 along the pivotable axis 54 (shown in FIG. 3) from a first position to a second position to modulate fluid flow through the interior passage 34.

In the preferred embodiment, the electronic actuator 78 is linear, but other rotational, or non-linear actuators could be used. Electronic actuators 78 may include, but are not limited to, servo motors, stepper motors, DC motors, and the like. Electronic actuators 78 are also considered to cover such motion control devices such as hydraulic actuators, pneumatic pressure actuators, and any single component, or a combination of component, that is capable of converting a electronic signal into a motion which may rotate the shaft and blade component 22 within the throttle body housing 20.

Figure 7:
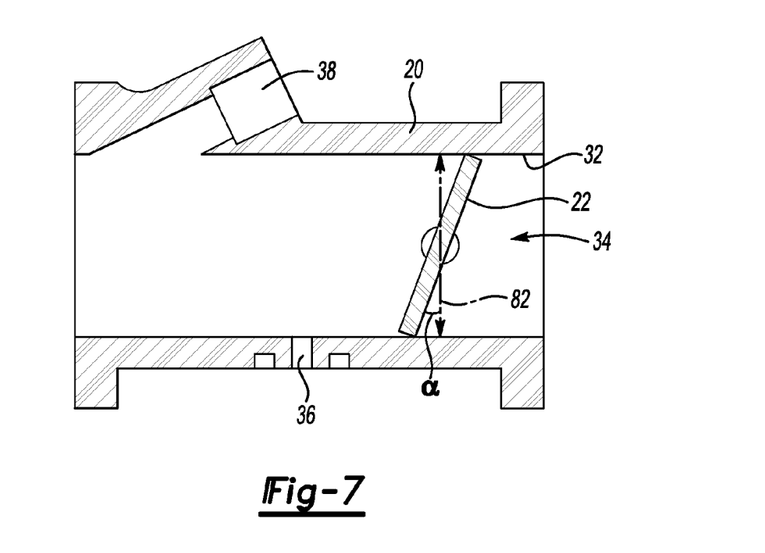
FIG. 7 is a cross-section view taken along line 7-7 in FIG. 2.

FIG. 7 shows a cross-section view of the throttle body housing 20 and shaft and blade component 22 taken along line 7-7 from FIG. 2. This figure shows the shaft and blade component 22 in the first position in which the fluid flow through the interior passage 34 is blocked. In this figure, the cross-section along the transverse axis 46 (shown in FIG. 3) can be seen to have an inner diameter 82. The blade section 52 is also shown in contact with the interior surface 32 such that an angle α is created between the face of the blade section and the cross-section taken along the transverse axis. In the preferred embodiment, α is an angle from 5° to 10°.

Figure 8:
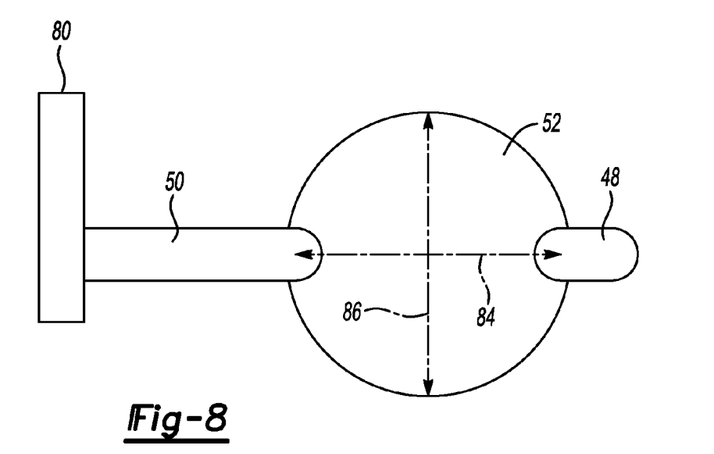
FIG. 8 is a top view of the unitary shaft and blade component.
Figure 9:
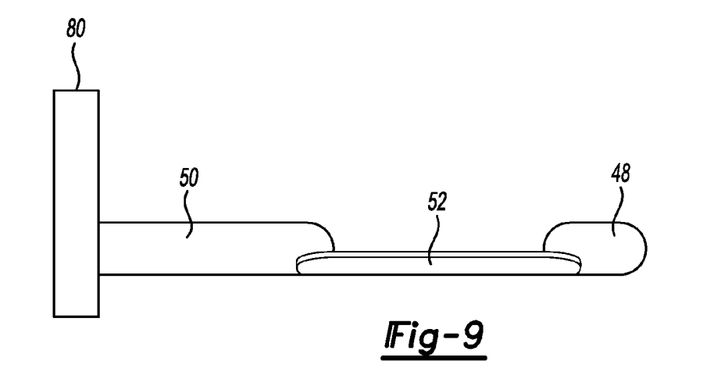
FIG. 9 is a side view of the unitary shaft and blade component.

Regarding FIGS. 8 and 9 top and side views of the shaft and blade component 22 are shown in their preferred embodiment. The blade section 52 is shown disposed between the first and second shaft sections 48,50. The blade section 52 is generally ovate shaped with a small diameter 84 running between the first and second shaft sections 48,50, and a large diameter 86 running generally perpendicular to the small diameter 84. The small diameter 84 of the blade section 52 is substantially equal to or smaller than the interior diameter 82 of the circular cross-section (see FIG. 7), and the large diameter 86 of the blade section 52 is substantially equal to or larger than the interior diameter 82 of the circular cross-section (see FIG. 7). These dimensions allow for the blade section 52 to rotate within this interior passage 34 and contact the interior surface 32 when in the first position. The actuation tab 80 extends from the second shaft section 50, which extends from the blade section 52, which in turn extends from the first shaft section 48, as you view from left to right.

Figure 10:
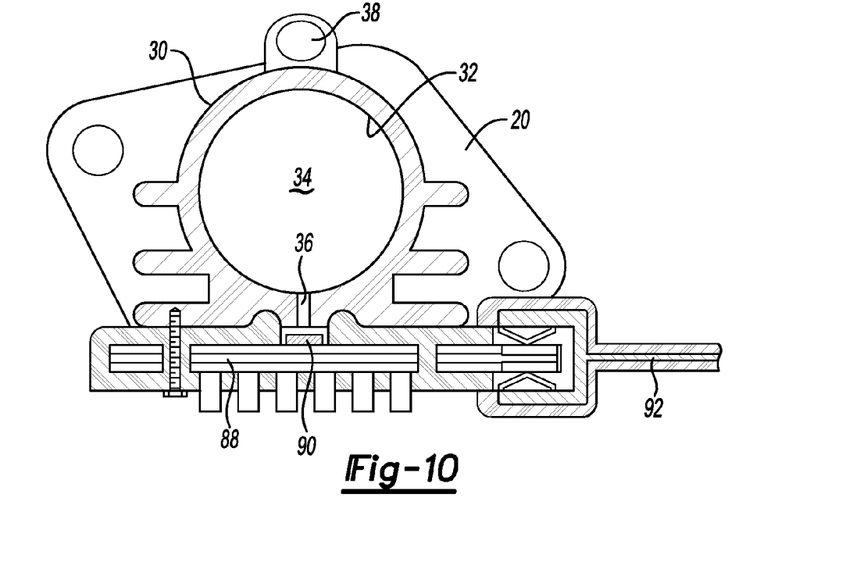
FIG. 10 is a cross-sectional view of a throttle body assembly showing a electronic throttle controller connected to the throttle body housing.

Regarding FIG. 10, a cross-sectional view of a throttle body assembly cut through the pressure passage 36 is shown. In this figure, the throttle body housing 22 defines a pressure passage 36 passing through the throttle body housing 22 from the interior surface 34 to the exterior surface 30, with an electronic throttle controller (ETC) 88 attached to the throttle body housing 22. In this embodiment, the ETC 88 has a pressure sensor 90 in fluid communication with the interior passage 34 through the pressure passage 36. The pressure sensor 90 reads the pressure in the interior passage 34 downstream from the shaft and blade component 22 (shown in FIG. 7), processes the readings, and sends a signal to the electronic actuator 78 (shown in FIG. 6) to partially rotate the shaft and blade component 22. The signal may be sent through a wiring harness 92 which is in electrical communication with the electronic actuator 78. The signal may also be sent wirelessly. In the preferred embodiment, a fuel injector (not shown) is inserted in the integrally formed injector pocket 38, and the ETC is programmed to modulate the fuel injector in coordination with the modulation of the blade section 52.

Figure 11:
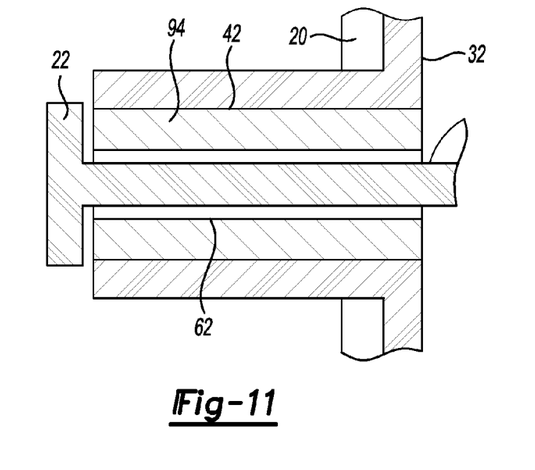
FIG. 11 is a partial cross-sectional view of an alternate embodiment of the shaft through-hole having a tube insert disposed between the shaft through-hole and the shaft and blade component.
Figure 12:
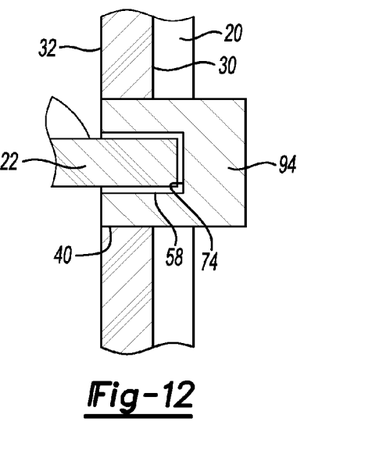
FIG. 12 is a partial cross-sectional view of an alternate embodiment of a shaft socket having a tube insert disposed between the shaft socket and the shaft and blade component.

Regarding FIGS. 11 and 12, alternate embodiments are shown in which tubular inserts 94, preferably made of metal or composite material, are at least partially disposed within the shaft socket 40 and the shaft through-hole 42, respectively, before the shaft and blade component 22 is injection molded into the throttle body housing 20. The throttle body housing 20 may be injection molded around one, or both, of the tubular inserts 94, or the tubular inserts 94 may be inserted into one, or both, of the shaft socket 40 and shaft through-hole 42, or in any combination.

The tubular insert 94 in FIG. 12 may also be a socket plug 76 (as shown in FIG. 5). As well, FIG. 12 shows the shaft socket 40 extending from the interior surface 32 to the exterior surface 30, as with the socket plug 76 design, however, the tubular insert 94 may also be disposed within a blind hole in which the throttle body housing defines the vertical surface 74, or the tubular insert defines the vertical surface 74, and the tubular inserts 94 may also include a taper.

Tubular inserts 94 are selected from materials that bond well to the throttle body housing 20, especially when the throttle body housing 20 is injection molded around the tubular inserts 94 and the throttle body housing 20 shrinks around the tubular inserts 94 during cooling, but do not bond well with the shaft and blade component 22. The tubular inserts 94 may also provide a smooth inner surface profile 58 of the shaft socket 40 and inner diameter 62 of the shaft through-hole 42, while also providing a surface that the shaft and blade component 22 will not readily adhere to when the shaft and blade component 22 is injection molded within.

In the preferred embodiment, which does not have the tubular inserts 94, the throttle body housing 20 is made from a first polymer, the shaft and pin component 22 is made from a second polymer, and the first and second polymers do not readily adhere to one another. It should be noted, however, that some initial sticking of the two polymers may occur, and this initial sticking may be broken when the shaft and blade component 22 is partially rotated the first time. This initial rotation causes a mechanical crack to occur between the first polymer and the second polymer, allowing the shaft and blade component 22 to thereafter rotate within the throttle body housing 20. The two polymers not readily adhering to one another covers such scenarios in which the two polymers do not allow any sticking, up to and including slight sticking, but is not intended to cover such a scenario where the two polymers fuse together and cannot be separated by a rotation of the of the shaft and blade component 22.

In the preferred embodiment, the second polymer also has a shrink rate substantially equal to or greater than the first polymer to allow the second polymer to pull away from the first polymer while cooling. Shrinkage is inherent in the injection molding process. Shrinkage occurs because the density of polymer varies from the processing temperature to the ambient temperature. The shrinkage of plastic parts can be as much as 20 percent by volume, when measured at the processing temperature and the ambient temperature.

The greater shrinkage rate of the second polymer allows the second polymer to keep up with or pull away from the first polymer during cooling. The first polymer of the throttle body housing 20 will have a head start in cooling and shrinking over the second polymer of the shaft and blade component 22, since the throttle body housing 20 is injection molded first. The second polymer shrink rate has to be at least substantially equal to or greater than the first polymer once the second polymer starts cooling. This time delay, due to the head start of the cooling of the first polymer, could actually allow for the material property shrink rate of the second polymer to be less than the first polymer, if the first polymer is given enough of a head start to compensate. For example, if the first polymer was completely cooled before the injection of the second polymer, the shrink rate of the second polymer is irrelevant, however, when the injection molding of the second polymer happens only moments after the first polymer, the comparative shrink rates of the two polymers needs to be considered. In the end, the first polymer may not squeeze the second polymer causing an interference fit to a point where the shaft and blade component 22 will not rotate within the throttle body housing 20.

In another embodiment, the throttle body housing 20 is made from a first polymer, the shaft and pin component 22 is made from a second polymer, and the second polymer has a lower melting temperature than the first polymer.

Figure 13:
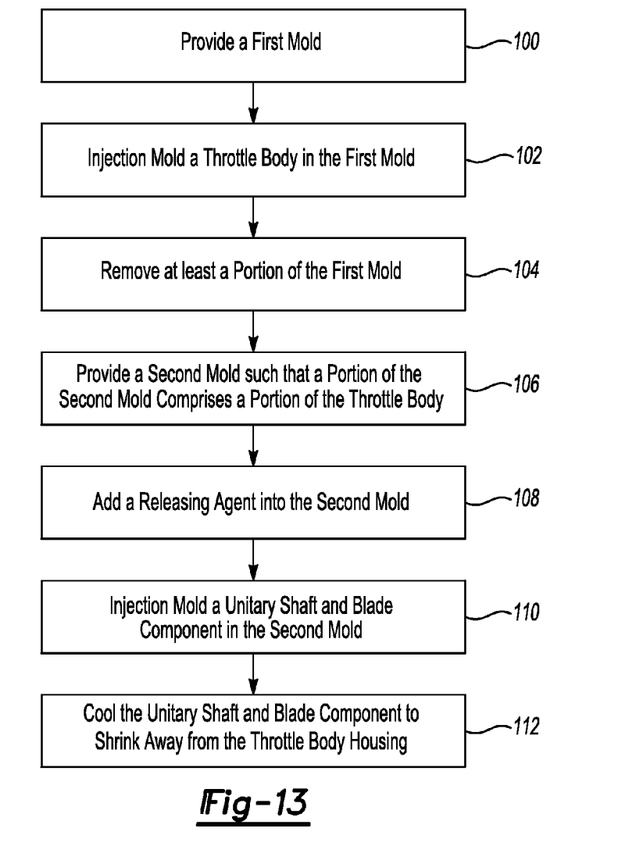
FIG. 13 is a block flow diagram of a method of manufacturing the throttle body housing with the blade and shaft injected molded in situ within the body.

Regarding FIG. 13 a block flow diagram of a method detailing the preferred embodiment of manufacturing the throttle body housing 20 with the blade and shaft 22 injected molded in situ within is shown. The method begins with the steps of providing a first mold 100, and injection molding a throttle body housing within the first mold 102.

During step 102, the first mold (not shown) defines the geometry of the throttle body housing 20 to have at least an exterior surface 30, a substantially annular interior surface 32 defining an interior passage 34 with a longitudinal axis 44 and a substantially circular cross-section transverse to the longitudinal axis 44 with a circumference and an inner diameter 82. The first mold also defines the geometry of the throttle body housing 20 to have a shaft socket 40 disposed along the interior surface 32 at a point on the circumference of the cross-section, and a shaft through-hole 42 disposed along the interior surface 32 at a point on the circumference of the cross-section opposite of the shaft socket 40.

The next steps in the method are to remove at least a portion of the first mold 104 and provide a second mold 106, such that a portion of the second mold comprises a portion of the geometry of the throttle body housing 20 previously injection molded in step 102. In the preferred embodiment, the portions of the second mold comprised by the throttle body housing 20 comprise the interior surface 32, shaft socket 40, and shaft through-hole 42. The throttle body housing 20 may be removed completely from the first mold and physically moved to the second mold, or the throttle body housing 20 may remain substantially stationary as the portions of the first mold retract away and the portions needed for the second mold are advance into position, or any combination of the two.

In one embodiment, the step of adding a releasing agent into the second mold 108 before the step of injection molding the unitary shaft and blade component in the second mold 110 is completed. The releasing agent reduces adhesion of the unitary shaft and blade component 22 to the throttle body housing 20. It should be noted, however, that this step may be omitted from the method by controlling other parameters.

Next, a step of injection molding the unitary shaft and blade component in the second mold 110 is completed. During step 110, the second mold defines the geometry of the unitary shaft and blade component 22 to have a first shaft section 48 at least partially disposed in the shaft socket 40, a blade section 52 connected to the first shaft section 48 disposed in the interior passage 34, and a second shaft section 50 connected to the blade section 52 opposite of the first shaft section 48 at least partially disposed in the shaft through-hole 42.

In the preferred embodiment, during the step of injection molding the unitary shaft and blade component in the second mold 110, the second mold also defines the geometry of the actuating tab 80 located on the end of the shaft and blade component 22. The actuating tab 80 is disposed outside of the throttle body housing 20, and the shaft and blade component 22 is a unitary piece injection molded within and outside of the throttle body housing 20.

In one embodiment, during the step of injection molding the throttle body housing in the first mold 102, a first plastic is used, and during the step of injection molding the unitary shaft and blade component in the second mold 110, a second plastic is used, such that the second plastic does not readily adhere to the first plastic reducing adhesion of the unitary shaft and blade component 22 to the throttle body housing 20.

The final step in the method is to cool the unitary shaft and blade component to shrink away from the throttle body housing 112. Step 110 mechanically entraps the shaft and blade component 22 within the throttle body housing 20, and step 112 allows for the shaft and blade component 22 to obtain some clearance between it and the throttle body housing 20 allowing it to at least partially rotate.

In another embodiment, during the step of injection molding the throttle body housing 102, the first mold defines the geometry of the shaft socket 40 to have a tapered wall 68 that tapers inward as the tapered wall extends away from the interior surface 32. During the step of injection molding the unitary shaft and blade component in the second mold 110, the tapered wall 68 of the shaft socket 40 defines a tapered segment 72 of the first shaft section 48. And it follows that, during the step of cooling the unitary shaft and blade component to cool and shrink away from the throttle body housing 112, the first shaft section 48 shrinks away from the shaft socket 40 in both a longitudinal and transverse direction providing additional clearance to aid in the ability of the unitary shaft and blade component 22 to at least partially rotate within the throttle body housing 20.

As well, during the step of injection molding the unitary shaft and blade component in the second mold 110, the second mold defines the geometry of the blade section 52 to have an ovate shape with an initial large diameter, and after the step of cooling the unitary shaft and blade component to cool and shrink away from the throttle body housing 112, the blade section 52 shrinks to an ovate shape with a final large diameter 86. The final large diameter 86 of the blade section 52 is such that when the portion of the blade section 52 on the final large diameter 86 contacts the interior surface 32, the blade section 52 has a 5° to 10° angle α to the circular cross-section transverse to the longitudinal axis.

Although several embodiments of the invention have been disclosed, it will be apparent to persons skilled in the art that modifications may be made without departing from the scope of the invention. All such modifications and equivalents thereof are intended to be defined by the following claims.

What is claimed is:

1. A throttle body assembly comprising:
a throttle body housing that is a single unitary piece having an exterior surface and a generally annular interior surface defining an interior passage with a longitudinal axis, wherein the throttle body housing defines a shaft through-hole passing through the throttle body housing from the interior surface to the exterior surface having a transverse axis generally perpendicular to the longitudinal axis, and a shaft socket disposed along the interior surface opposite the shaft through-hole and aligned along the transverse axis; and
a single-molded shaft and blade component that is a single unitary piece with an uninterrupted and continuous external surface, the shaft and blade component made of a single material and having a pivotable axis generally coaxial with the transverse axis, the shaft and blade component having a blade section disposed within the interior passage, a first shaft section extending from the blade section along the pivotable axis at least partially disposed within the shaft socket, and a second shaft section disconnected from the first shaft portion and extending from the blade section along the pivotable axis opposite the first shaft section, at least partially disposed within the shaft through, wherein the blade section has a generally constant thickness throughout, including in a region of a blade section between the first and second shaft sections, wherein the shaft and blade component is injection molded in situ within the throttle body housing to mechanically entrap the shaft and blade component within the throttle body housing while allowing the shaft and blade component to at least partially rotate.

2. The throttle body assembly of claim 1 wherein the shaft socket is a blind hole extending from the interior surface into the throttle body housing without breaking through to the exterior surface.

3. The throttle body assembly of claim 1 wherein the shaft socket is a hole extending from the interior surface through to the exterior surface, and the throttle body assembly further comprising a socket plug at least partially inserted into the shaft socket adjacent the exterior surface such that when inserted provides a bottom of a blind hole.

4. The throttle body assembly of claim 1 wherein the first shaft section has an outer surface profile, the shaft socket has an inner surface profile, and the inner surface profile of the shaft socket is larger than the outer surface profile of the first shaft section allowing for the shaft and blade component to at least partially rotate about the pivotable axis.

5. The throttle body assembly of claim 1 wherein the second shaft section has a substantially constant outer diameter extending along the length of the second shaft section, the shaft through-hole has a substantially constant inner diameter extending along the length of the shaft through-hole, and the shaft through-hole inner diameter is larger than the second shaft outer diameter allowing for the shaft and blade component to at least partially rotate about the pivotable axis.

6. The throttle body assembly of claim 1 wherein the interior surface has a generally circular cross-section along the transverse axis between the shaft socket and the shaft through-hole with an interior diameter, the blade section is generally ovate shaped with a small diameter and a large diameter, wherein the small diameter of the blade section is substantially equal to or smaller than the interior diameter of the circular cross-section, and the large diameter of the blade section is substantially equal to or larger than the interior diameter of the circular cross-section.

7. The throttle body assembly of claim 1 wherein the shaft and blade component further comprise an actuation tab connected to the second shaft section opposite of the blade section and extending way from the second shaft section in a generally perpendicular direction to the pivotable axis.

8. The throttle body assembly of claim 7 further comprising an electronic actuator in contact with the actuation tab, wherein the electronic actuator is capable of moving the actuation tab and at least partially rotating the shaft and blade component along the pivotable axis from a first position to a second position to modulate fluid flow through the interior passage.

9. The throttle body assembly of claim 1 wherein the throttle body housing defines a pressure passage passing through the throttle body housing from the interior surface to the exterior surface, and the throttle body assembly further comprises an electronic throttle controller attached to the throttle body housing having a pressure sensor in fluid communication with the interior passage through the pressure passage.

10. The throttle body assembly of claim 1 wherein the throttle body housing defines an integrally formed injector pocket capable of receiving a fuel injector.

11. The throttle body assembly of claim 1 wherein the throttle body housing is made from a first polymer, the shaft and blade component is made from a second polymer, and the first and second polymers do not readily adhere to one another.

12. The throttle body assembly of claim 1 wherein the throttle body housing is made from a first polymer, the shaft and blade component is made from a second polymer, and the second polymer has a lower melting temperature than the first polymer.

13. The throttle body assembly of claim 1 wherein the throttle body housing is made from a first polymer, the shaft and blade component is made from a second polymer, and the second polymer has a shrink rate substantially equal to or greater than the first polymer to allow the second polymer to pull away from the first polymer while cooling.

14. A throttle body assembly comprising:
a throttle body housing having a generally annular wall defining an exterior region and an interior passage with a radial aperture extending there through defined by an aperture wall; and
a single-molded shaft and blade component that is a single unitary piece with an uninterrupted and continuous external surface, the shaft and blade component made of a single material and injection molded in situ within the throttle body housing to mechanically entrap the shaft and blade component within the throttle body housing such that the shaft and blade component is at least partially disposed within the interior passage, the radial aperture, and the exterior region, and yet the shaft and blade component is at least partially rotatable in relation to the throttle body housing, and wherein a shaft portion of the shaft and blade component is disposed within the radial aperture and unengaged with the aperture wall.

* * * * *

UNITED STATES PATENT AND TRADEMARK OFFICE
CERTIFICATE OF CORRECTION

PATENT NO. : 9,233,493 B2  Page 1 of 1
APPLICATION NO. : 13/248559
DATED : January 12, 2016
INVENTOR(S) : Kyle E. Schwulst et al.

It is certified that error appears in the above-identified patent and that said Letters Patent is hereby corrected as shown below:

Claims

Column 12, Line 14, Claim 7:

After "extending"
Delete "way" and
Insert -- away --.

Signed and Sealed this
Twenty-sixth Day of April, 2016

Michelle K. Lee
*Director of the United States Patent and Trademark Office*